S. T. CULP.
TIRE ARMOR.
APPLICATION FILED JAN. 24, 1916.
1,203,985.
Patented Nov. 7, 1916.
2 SHEETS—SHEET 1.
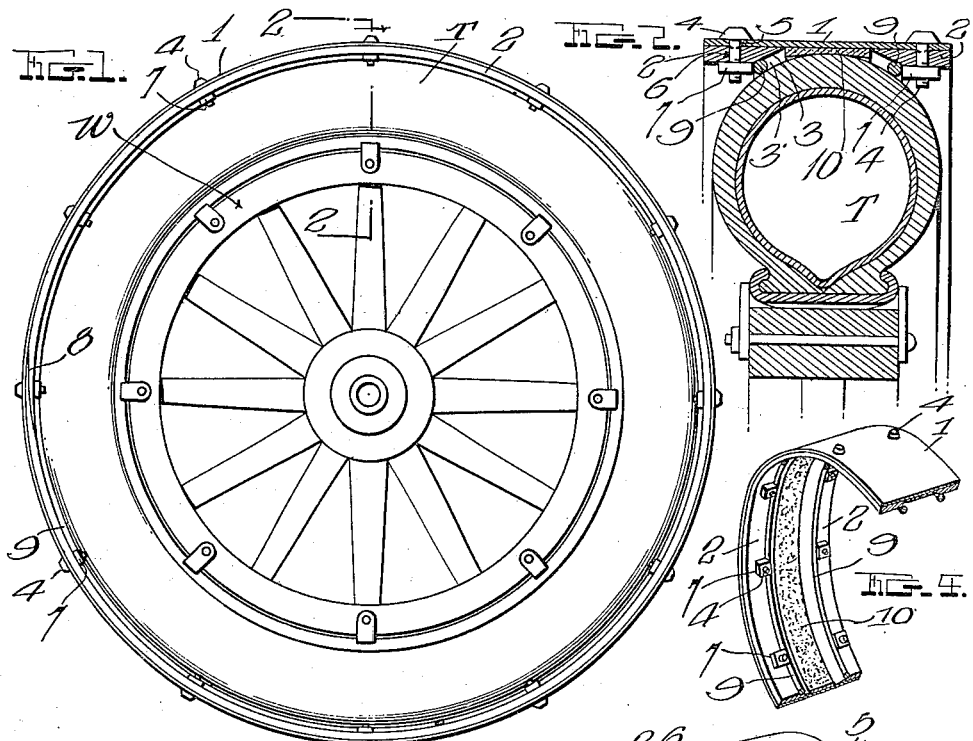
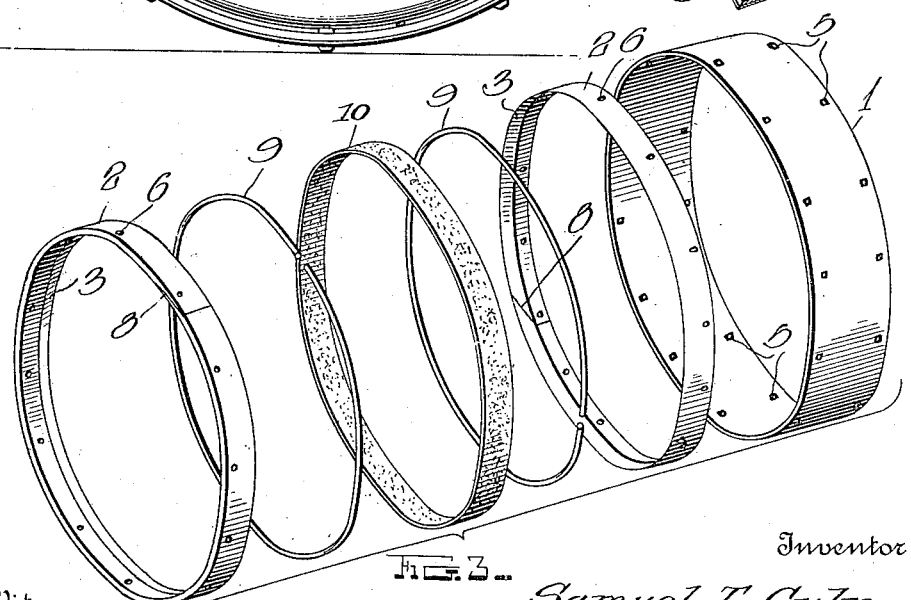
Witnesses
H. Woodard
Inventor
Samuel T. Culp
by
Attorneys S. T. CULP.
TIRE ARMOR.
APPLICATION FILED JAN. 24, 1916.
1,203,985.
Patented Nov. 7, 1916.
2 SHEETS—SHEET 2.
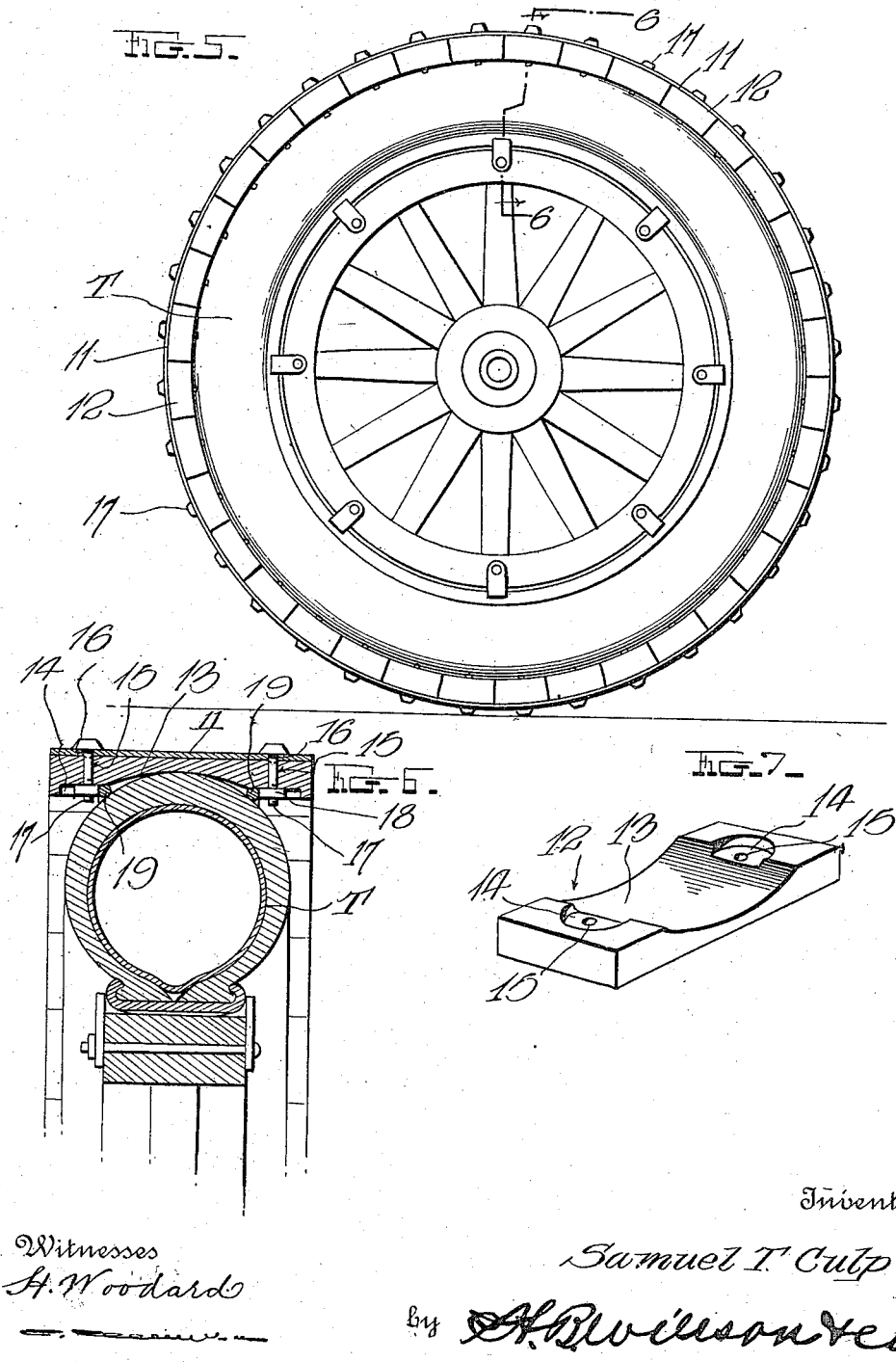
Witnesses
H. Woodard
Inventor
Samuel T. Culp
by H. B. Willson & Co.
Attorneys

UNITED STATES PATENT OFFICE.

SAMUEL THADDEUS CULP, OF LITTLETON, COLORADO.

TIRE-ARMOR.

1,203,985.

Specification of Letters Patent.

Patented Nov. 7, 1916.

Application filed January 24, 1916. Serial No. 73,957.

*To all whom it may concern:*

Be it known that I, SAMUEL T. CULP, a citizen of the United States, residing at Littleton, in the county of Arapahoe and State of Colorado, have invented certain new and useful Improvements in Tire-Armors; and I do declare the following to be a full, clear, and exact description of the invention, such as will enable others skilled in the art to which it appertains to make and use the same.

This invention relates to improvements in armors for pneumatic and other resilient tires, and has for its principal object to provide a simple and effective means for preventing punctures.

Another object of the invention is to provide a device which can be very quickly and easily attached to any pneumatic tire, and when once placed thereon, will be reliably held against lateral movement.

With the above and other objects in view, my invention resides in certain novel features of construction, combination and arrangement of parts which will hereinafter be more particularly described and claimed and shown in the drawings wherein:—

Figure 1 represents a side elevation of an automobile wheel showing the application of my invention to the tire thereof; Fig. 2 is a detail transverse section taken on the line 2—2 of Fig. 1; Fig. 3 is a perspective view of the armor showing the principal parts thereof in disassembled position; Fig. 4 is a detail perspective view of a portion of the armor removed from the tire, the parts being in assembled position; Fig. 5 is a view similar to Fig. 1 showing a slightly modified form of armor; Fig. 6 is a detail transverse section taken on the line 6—6 of Fig. 5; Fig. 7 is a detail perspective view of one of the reinforcing members used in this modified form.

In the drawings, I have illustrated several forms of my invention applied to a pneumatic tire T mounted upon an ordinary automobile wheel W in the usual manner, the preferred form of my device being illustrated in Figs. 1 to 4.

The device is designed to be placed around the vehicle wheel in the manner shown to prevent punctures and the like, and comprises an annular band 1 of spring steel of any suitable thickness and preferably of a width somewhat greater than the diameter of the tire. The best results are obtained by extending this band about one-half of an inch on each side of the tire, thus in a three and one-half inch tire, the width of the band would be approximately four and one-half inches. On the inner side of this band 1 is placed a pair of annular reinforcing members 2, the outer edges of which are flush with the edges of the band 1, while their inner adjacent edges are spaced apart and beveled off as shown at 3 to form a seat in which the tread portion of the tire T is disposed. These parts are connected to the annular band 1 by fastening elements here shown in the form of bolts 4 which extend through alined apertures 5 and 6 in the band and members respectively. The openings 5 are preferably squared to receive the squared portion of the bolt 4, the head of which is disposed on the outer side of the band 1 as shown. These heads are substantially frustoconical in shape and form studs for preventing skidding of the wheels over wet pavements or the like. The inner ends of the bolts 4 are threaded and receive the nuts 7, thus securely clamping the reinforcing members and the band 1 together. It will be noticed that these parts 2 are not in the form of endless bands, but are split as shown at 8 to add resiliency to the band 1, these parts being added thereto to prevent bending of the band under excessive weight. In some cases, these reinforcing members might be done away with by providing a heavier band 1, but in such a case, the resiliency of the armor would be impaired.

The nuts 7 act as stops for a pair of split retaining rings 9 which are disposed one on each side of the tread portion of the tire T within the seat 3' as shown. From the drawings it will be seen that these rings 9 are formed of heavy wire and serve as means for preventing the armor from sliding off the tire when the same is inflated. These rings, as hereinbefore mentioned, contact with the nuts 7 and prevent their loosening because of the jolts received by the armor in passing over rough roads. From this description it will be seen that these rings perform the twofold function of holding the armor to the tire and also preventing the loosening of the nuts 7.

In applying the armor to a pneumatic tire, the same is first deflated and then the band 1 with its reinforcing members and retaining rings is shoved on the tire until the tread portion thereof is received in the seat 3'. When the tire T is again inflated, its tread portion will be securely held in said seat by the retaining rings 9, one of which is disposed on each side thereof. However, before placing the armor upon the tire, a protective ring 10 is placed in the bottom of the seat 3'. This ring is preferably formed of asbestos and serves as a cooling medium between the rubber tire and the steel band 1, and also as a wear member to protect the tire should the armor tend to creep thereon.

In Figs. 5 to 7, I have shown a modified form of tire armor employing the general idea and arrangement embodied in the preferred form just described. This form also comprises an annular metallic band 11 which surrounds the tire T. The reinforcing members in this case, however, are a plurality of arcuate sections 12 which are disposed edge to edge around the inner side of the metallic band 11, and are preferably formed of a hard wood. There is a very slight space between each of these wood reinforcing blocks so that the flexible band 1 will have a slight movement when the machine goes over rough roads. Each of the reinforcing blocks 12 has a seat 13 therein which alines with the seats in the other blocks and receives the tread portion of the tire T when the same has the armor applied thereto. The number of these reinforcing blocks depend upon the size of the tire with which the armor is to be used.

The ends of the members 12 are flush with the outer edges of the band 11 and are provided on their inner faces adjacent to said ends with recesses 14 which communicate with the seats 13 in the middle portion thereof. These recesses 14 also communicate with apertures 15 alined with openings 16 in the band 11. It will be seen that there are two openings 15 in each of the members 12, one being disposed adjacent each end, and they are adapted to receive fastening elements preferably in the form of bolts 17 for connecting said members to the band 11. The outer end portions of the bolts 17 adjacent their heads are squared as are also the openings 16 in which said squared portion is disposed. This arrangement prevents the turning of the bolts when the nuts 18 are applied thereto. The heads of these bolts 17 are preferably frusto-conical in shape and are disposed on the outer side of the band 11 for the same purpose as the heads of the bolts in the preceding form. The nuts 18 when tightened upon the bolts are disposed in the recesses 14, said recesses being sufficiently large to receive a socket wrench for tightening the nuts. These nuts also act as stop lugs as the nuts 7 in the preceding form, to limit the outward movement of the split retaining rings 19, one of which is disposed on each side of the tire T to retain the same in its seat 13, as will be readily understood without further description, after an examination of the preceding form. The method of applying this type of armor is the same in all respects to the means set forth in regard to the form illustrated in Figs. 1 to 4.

The bands 1 and 11 of the devices heretofore described may be provided on their outer surfaces with any preferred form of anti-skid projections.

From the foregoing description of the construction and operation of the various forms of my invention, it will be seen that I have produced a very novel and effective armor which will prevent punctures and blow outs in pneumatic tires when applied to the same. The device will also greatly facilitate the traction of the vehicle not only over paved streets, but over rough and muddy dirt roads.

I claim as my invention:

1. The combination with a vehicle wheel; of an annular band surrounding said wheel, a plurality of stops extending inwardly at intervals from said band, and a pair of quickly adjustable split retaining rings, one of said rings being disposed on each side of the tire of the wheel and contacting with said stops.

2. The combination with a vehicle wheel; of an annular band surrounding said wheel, a pair of reinforcing members secured to the inner side of said band at its edges, the inner sides of said members being flat and having their adjacent edge portions beveled from said flat sides toward the center of said band to form a seat to receive the tire of said wheel, a plurality of bolts extending through said band and the members, nuts on the inner ends of said bolts engaging the flat faces of said members, and a pair of rings, one engaging each side of the tire of said wheel, said rings contacting with the beveled portions of said members and said nuts.

In testimony whereof I have hereunto set my hand in presence of two subscribing witnesses.

SAMUEL THADDEUS CULP.

Witnesses:
CASPER BROEMMEL,
HENRY KRAFT.

Copies of this patent may be obtained for five cents each, by addressing the "Commissioner of Patents, Washington, D C."